Dec. 14, 1954

C. B. CONWELL 2,696,887

GOVERNOR CONTROL FOR HELICOPTERS

Filed Feb. 17, 1948

Inventor
Charles B. Conwell
By Harris G. Luther
Attorney

Dec. 14, 1954  C. B. CONWELL  2,696,887
GOVERNOR CONTROL FOR HELICOPTERS
Filed Feb. 17, 1948  11 Sheets-Sheet 3

INVENTOR
*Charles B. Conwell.*
BY *Harris G. Luther*
ATTORNEY

Dec. 14, 1954  C. B. CONWELL  2,696,887
GOVERNOR CONTROL FOR HELICOPTERS
Filed Feb. 17, 1948  11 Sheets-Sheet 4

Fig. 5.

Inventor
Charles B. Conwell
by Harris G. Luther
Attorney

Dec. 14, 1954     C. B. CONWELL     2,696,887
GOVERNOR CONTROL FOR HELICOPTERS Filed Feb. 17, 1948     11 Sheets-Sheet 5

Fig. 6.

Inventor
Charles B. Conwell
by Harris G. Luther
Attorney

Dec. 14, 1954  C. B. CONWELL  2,696,887
GOVERNOR CONTROL FOR HELICOPTERS
Filed Feb. 17, 1948  11 Sheets-Sheet 6

INVENTOR
Charles B. Conwell.
BY Harris G. Luther
ATTORNEY

Dec. 14, 1954  C. B. CONWELL  2,696,887
GOVERNOR CONTROL FOR HELICOPTERS
Filed Feb. 17, 1948  11 Sheets-Sheet 8

INVENTOR
*Charles B. Conwell.*
BY *Harris G. Luther*
ATTORNEY

Dec. 14, 1954  C. B. CONWELL  2,696,887
GOVERNOR CONTROL FOR HELICOPTERS
Filed Feb. 17, 1948  11 Sheets-Sheet 9

Inventor
Charles B. Conwell
by Harris G. Luther
Attorneys

Dec. 14, 1954   C. B. CONWELL   2,696,887
GOVERNOR CONTROL FOR HELICOPTERS
Filed Feb. 17, 1948   11 Sheets-Sheet 10

INVENTOR
Charles B. Conwell.
BY Harris G. Luther
ATTORNEY

Dec. 14, 1954  C. B. CONWELL  2,696,887
GOVERNOR CONTROL FOR HELICOPTERS
Filed Feb. 17, 1948  11 Sheets-Sheet 11

Inventor
Charles B. Conwell
by Harris G. Luther
Attorney

United States Patent Office 2,696,887
Patented Dec. 14, 1954

2,696,887

GOVERNOR CONTROL FOR HELICOPTERS

Charles B. Cenwell, Glastonbury, Conn., assignor to United Aircraft Corporation, East Hartford, Conn., a corporation of Delaware Application February 17, 1948, Serial No. 8,777

5 Claims. (Cl. 170—135.74)

This invention relates to helicopters and the controls thereof, particularly to a governor control for a helicopter rotor and more particularly to means for improving the operating characteristics of the governor control.

An object of this invention is a mechanism which will shorten the time of response of a governor controlled helicopter to changes in throttle setting of the engine.

Another object of this invention is to provide means for changing the pitch of the governor controlled rotor blades immediately as the engine throttle setting is altered.

A further object of this invention is to provide in a governor controlled helicopter in addition to manual control means, means for changing the pitch of the rotor blades immediately as the throttle setting is changed without permanently altering the governor speed setting.

A still further object of this invention is to provide means for temporarily resetting the governor speed setting immediately as the engine throttle setting is changed and automatically returning the governor to its original speed setting with the throttle in the changed position.

Other objects and advantages will be apparent from the specification and claims and from the accompanying drawings.

The invention forming the subject matter of this application has been shown with a helicopter of the type shown in U. S. patent application Serial No. 625,794 of I. I. Sikorsky et al, dated October 31, 1945, now patent No. 2,529,635 to which reference may be made for a more complete disclosure.

Figure 1:
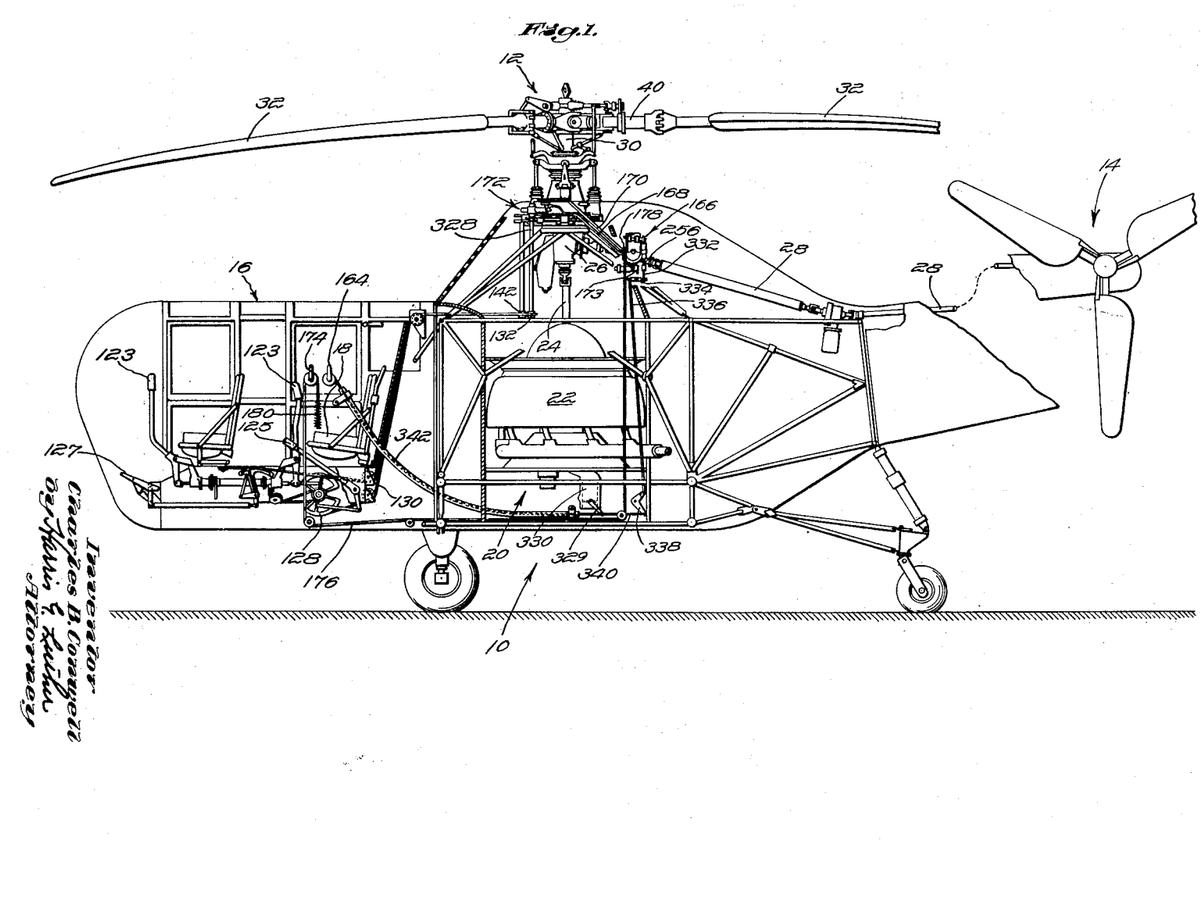
Fig. 1 is a side elevation of a helicopter, with the side covering broken away.

Fig. 1 illustrates the general design of the helicopter in which the fuselage is generally indicated at 10, the main rotor at 12 and the auxiliary rotor at 14. The forward part of the fuselage is a pilot's compartment 16, containing the pilot's seat 18 and the various controls for the helicopter. Engine compartment 20 is located to the rear of the pilot's compartment and contains an air-cooled engine 22 driving a drive shaft 24 which turns a high speed gear of the gear box 26 to drive the auxiliary rotor drive shaft 28 and the main rotor drive shaft 30 to which the main rotor blades 32 are attached by the hub.

Figure 2:
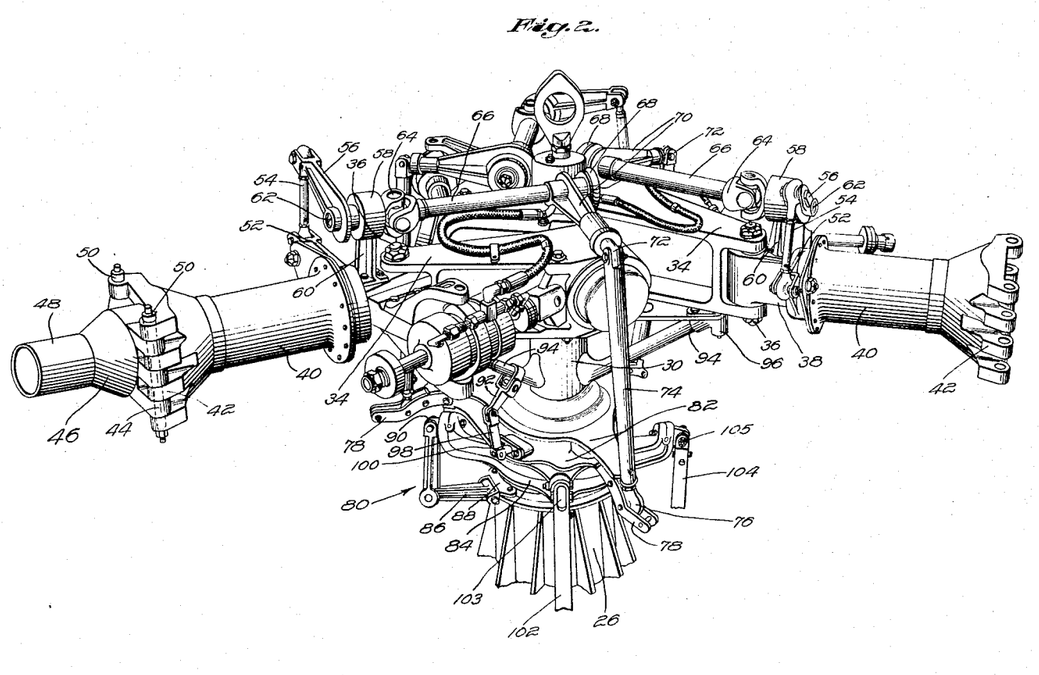
Fig. 2 is a perspective view of the rotor head.

In Fig. 2 the connection of the blades 32 with the main rotor drive shaft 30, and the control connections to the rotor head are shown. The drive shaft 30 extends upwardly from the upper part of the gear box 26 and carries a spider which includes radially extended spindles having substantially horizontal axes spaced 120 degrees from each other to accommodate the mountings for the rotor blades. Each spindle has rotatably mounted upon it a flapping hinge 34. The outermost end of flapping hinge 34 carries a vertical hinge 36 on which is pivoted a stub spar 38. Mounted on spar 38 on radial bearings (not shown) so that it may rotate about the axis of stub spar 38 is a sleeve 40 which is provided at its end with perforated ears 42 that mate with ears 44 on the cuff 46 containing the blade spar 48 and receive a pair of taper pins 50 for securing the two together.

The rotor blades 32 change pitch on said bearing (not shown) about stub spar 38 and are turned by rocker arms 52 secured to sleeve 40. The rocker arm 52 extends towards the trailing edge of the blade 32 and is pivotally connected by a push-pull link 54 to a crank 56 on crank shaft 62 mounted for pivotal movement in a bearing 58 carried by a bracket 60 on said stub spar 38 near vertical hinge 36. A universal joint 64 connects the crank shaft 62 with a rocker shaft 66. The universal joint 64 has its center in vertical alignment with the drag hinge or pivot 36 so that the fore and aft movements of the blade 32 will not change the pitch setting of the blade. The rocker shaft 66 has its other end pivotally mounted in a bracket 68 supported atop the flapping link 34 at its inner end. A crank arm 70 extends laterally of the link 34 and is non-rotatably secured at its inner end to the rocker shaft 66. The outermost end of the arm 70 extends beyond the spindle cap and is provided with a universal pivot 72 connecting the arm with a substantially vertical push-pull rod 74, which, at its lower end, is universally pivoted at 76 to an arm 78 of a control mechanism generally indicated by the reference character 80. As the rod 74 is raised by mechanism 80 the crank arm 70 will be raised to turn the rocker shaft 66 and the crank shaft 62 to lower the crank 56 and the pitch changing arm 52 to increase the pitch of the rotor blade attached thereto. When the rod 74 is lowered the opposite action occurs and the pitch of the rotor blade will be decreased.

The pitch control mechanism 80 is universally mounted upon the drive shaft 30 by a vertically slidable spherical bearing segment (not shown) (Fig. 2 of Patent No. 2,529,635). A mating internal spherical bearing surface is secured within a sleeve 82 which rotates with shaft 30 and has secured to it the arms 78 for controlling the pitch of the rotor blades 32 as described above. A non-rotating control plate 84 is rotatably secured by antifriction bearings to the rotatable sleeve 82. The plate 84 is maintained nonrotatable with respect to the gear box 26 by a scissors arrangement comprising arms 86 secured by bracket 88 to the gear box 26 and a universal connection 90 to the plate 84. The arms 78 and sleeve 82 are maintained rotatable with shaft 30 by a scissors arrangement, consisting of a link 92 which is secured to a compression rod 94 (which arm provides a down stop 96 for flapping link 34) and a link 98 that is universally connected at 100 to sleeve 82.

Jack shafts 102, a pair of which are mounted diametrically opposite fore and aft of the shaft 30 universally connected at 103 to control plate 84, may be moved up and down differentially to cyclically change the pitch of the rotor blades 32 for fore and aft movement of the helicopter. A jack shaft 104 is arranged at the side of shaft 30 universally connected at 105 to plate 84 and can be moved up and down to control the rotor blade pitch cyclically for lateral movements of the helicopter or moved together in the same direction with both jack shafts 102 to change the pitch of all rotor blades simultaneously for vertical movements of the helicopter. The jack screw that operates the jack shaft is shown in some detail in Fig. 3. A bracket 106 may be secured to the gear housing 26 or other fixed parts of the craft and connected to a housing 108 which supports, by bearings 110, a rotatable internally threaded sleeve 112 which connects at its lower end with a sprocket 114. The jack shaft 102 (or 104) connects by a ball joint and radial and thrust bearing 116 with an externally threaded sleeve 118 and is internally splined to a shaft 120 which connects at its lower end to a sprocket 122 that is spaced by a bearing 124 from the sleeve 112. As the sprocket 114 is rotated with respect to the sprocket 122, the threads between sleeves 112 and 118 will cause the jack shaft 102 (or 104) to be raised or lowered. If one sprocket is turned an equal amount but oppositely to the turning of the other sprocket, the jack shaft will move vertically as a function of the summation of the movements determined by the screw pitch. If the sprockets turn the same amount in the same direction, the jack shaft will remain stationary.

Figures 3, 4:
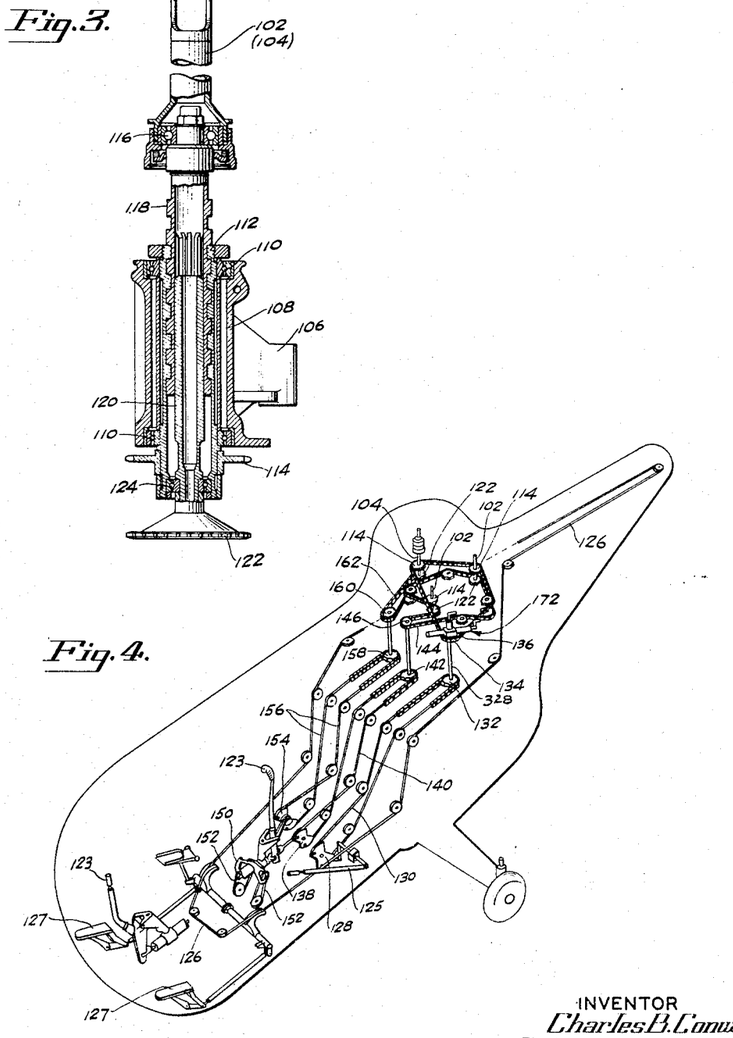
Fig. 3 is a detail sectional view of the portion of the jackscrew and jackshaft combination cooperable with the controls of the rotor head and with the manual control means in the cabin of the helicopter.
Fig. 4 is a diagrammatic view of the manual and servo control means and the jackscrew operating means associated therewith.

In Fig. 4 the operating mechanism for the jack shafts 102 and 104 is shown diagrammatically along with the other controls for effecting manual control of the helicopter and including the control sticks 123 and total pitch control lever 125. The pedals 127 control the tail rotor pitch by means of cable 126 and have no direct effect upon the control of the main rotor. When the total pitch control lever 125 is raised a quadrant 128 is rotated in a clockwise direction to move a cable 130 toward the right to rotate a sprocket 132 in a clockwise direction and through a torque tube 323 and additional sprocket 134 moves a chain 136 in a clockwise direction to turn the several sprockets 114 in a direction simultaneously to raise the jack shafts 102 and jack shaft 104 to thereby raise the whole control mechanism 80 and all of the control rods 74 to rotate all of the rotor blades 32 equally in a pitch increasing direction in the manner described above. As the total pitch control lever 125 is moved downwardly the opposite rotation will result and a pitch decreasing motion will occur in the rotor blade control linkage.

When the control stick 123 is moved in the forward direction, a quadrant 138 will be rotated in a clockwise direction, a cable 140 will be moved toward the right and a sprocket 142 will be rotated in a counterclockwise direction to move a chain 144 by means of a torque tube on additional sprocket 146 generally in a counterclockwise direction. The chain 144 leads through suitable idler sprockets and the lower actuating sprockets 122 to rotate the rear jackscrew sprocket 122 in a clockwise direction raising rear jack shaft 102 and the forward jackscrew sprocket 122 in a counterclockwise direction lowering forward jack shaft 102, which actions will differentially move the fore and aft parts of the tilt mechanism 80 to tilt it upward at the rearward part and downward at the forward part. Inasmuch as the blade control arms 56 (Fig. 2) lead the position of the blade 32 by substantially 90° in the direction of rotation, the tilt mechanism will cause the highest pitch of the blade to occur when the blade is substantially at a right angle to the left of the helicopter looking toward the front and the minimum pitch to occur diametrically opposite in its path of rotation. This will cause the tip path plane of the blades 32 to tilt upwardly at the rear of the ship and downwardly at the front of the ship to provide a forward lateral component of rotor thrust to obtain translation and directional control. Such action is more fully pointed out and claimed in the application of I. I. Sikorsky, U. S. application Serial No. 592,862, filed May 9, 1945, now Patent No. 2,517,509, to which reference may be made.

As the control stick 123 is moved to the right or to the left a quadrant 150 will be rotated to move cables 152 differentially and to rotate a quadrant 154 to move a cable 156 and rotate a sprocket 158. The sprocket 158 turns a torque tube and additional sprocket 160 to move a chain 162 connected with the lower sprocket 122 connected with the jack shaft 104 to tilt the mechanism 80 laterally of the craft to cause a tip path plane of the rotor blades to tilt in a direction corresponding to the tilt of the control stick 123.

The mechanism thus far described is a manually controlled helicopter in which lateral movements and fore and aft movements are controlled by the control stick 123. Yawing movements are controlled by the pitch changing in the auxiliary rotor 14 not described and vertical movements are controlled by the main pitch control 125 and the throttle 164. In the structure illustrated, the vertical movements of the helicopter may be controlled by the throttle 164 and either a governor generally indicated at 166 or the main pitch control lever 125. The governor generally indicated at 166 controls the flow of pressure hydraulic fluid through conduits 168 and 170 to either side of the piston in a servo-motor generally indicated at 172. The servo-motor drives sprocket 134 which moves chain 136 to raise or lower jack shafts 102 and 104 to change the pitch of all rotor blades 32 simultaneously to cause vertical movement of the helicopter. The governor speed setting which controls the speed of the rotor, generally indicated at 12, and blades 32 is controlled by governor control lever 174 in the pilot's compartment 16. This control is transmitted to the governor by cable 176 which connects with pulley 178 mounted on the governor. This cable 176 is held in balance between 174 and 178 by means of friction and oppositely acting springs 180 and 182 having one end fastened to the cable and the other the fuselage.

Conduits 168 and 170 are provided with connecting by-pass conduits 169 and 171 that are joined at a solenoid operated valve generally indicated at 173 (Fig. 8) which is actuated by a switch 181 that is located in the pilot's compartment 16 and is accessible to the pilot. When the solenoid valve is energized, the hydraulic pressure fluid will by-pass the servo-motor, generally indicated at 172, thus disabling the servo-motor and permitting the helicopter to be operated manually.

Figure 6:
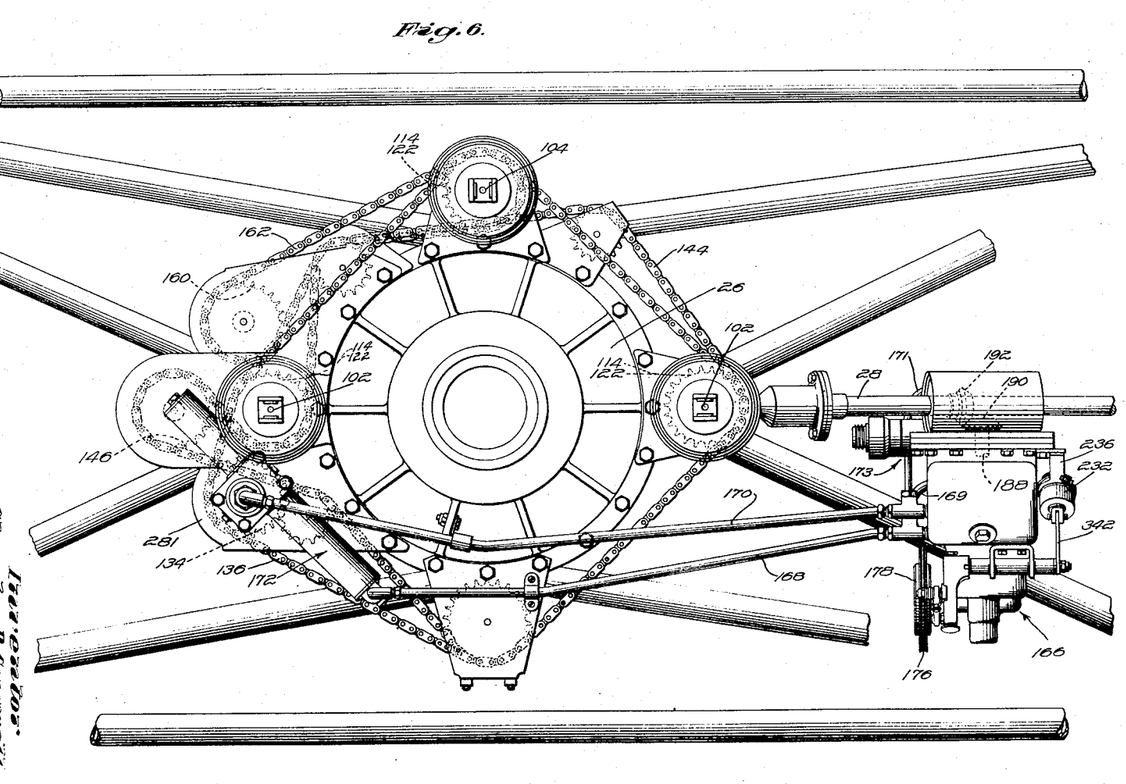
Fig. 6 is a plan view of the jackscrew operating means and the governor control means associated therewith.
Figure 7:
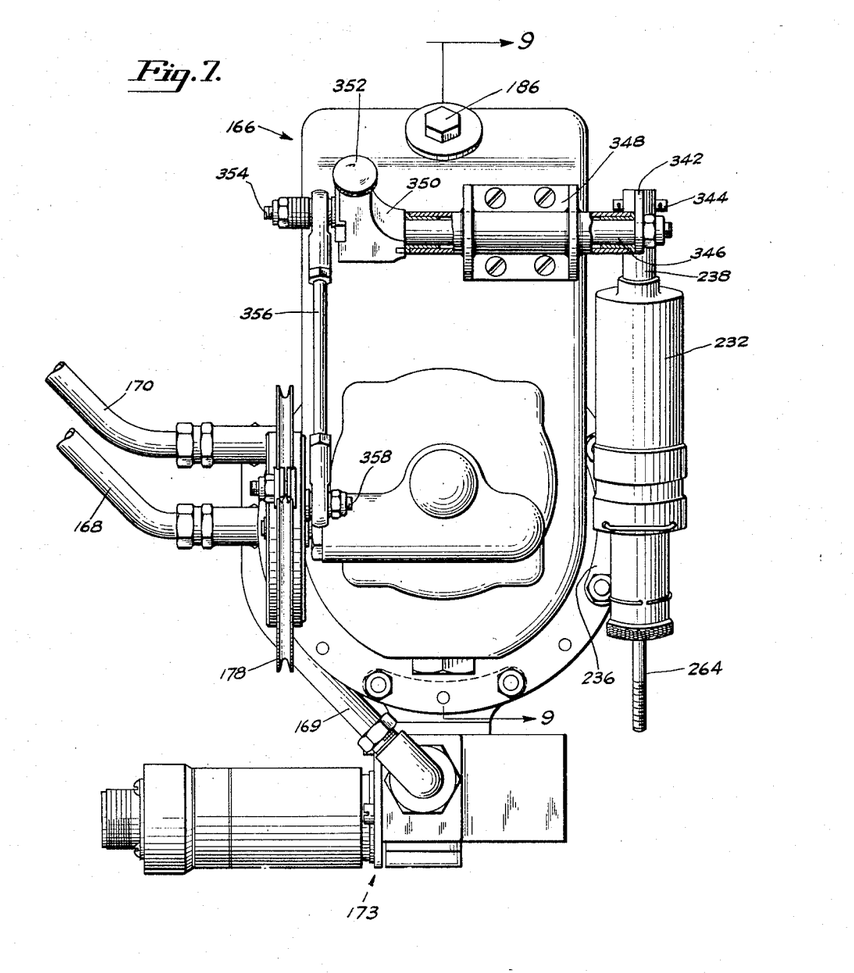
Fig. 7 is a side elevation view of the governor, governor speed setting pulley, anticipator and connecting means to the governor pulley.
Figure 8:
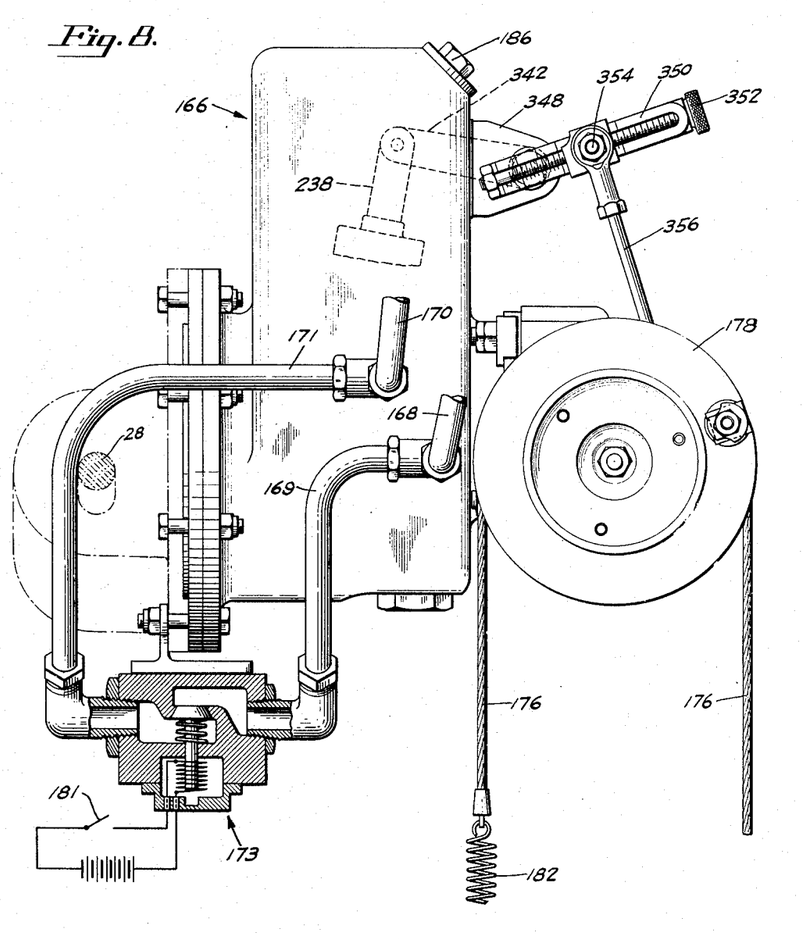
Fig. 8 is a front elevation view of Fig. 7 including a sectional diagrammatic view of the solenoid control valve.
Figure 9:
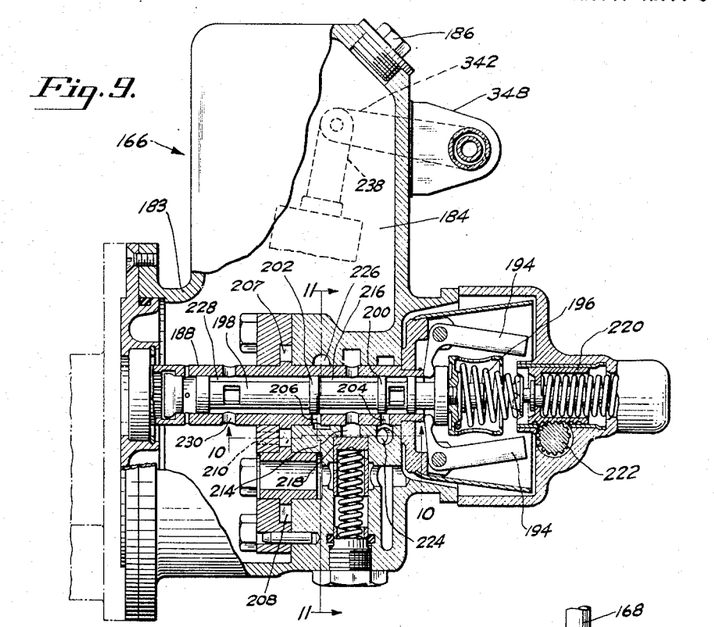
Fig. 9 is a section 9—9 of Fig. 7.
Figure 10:
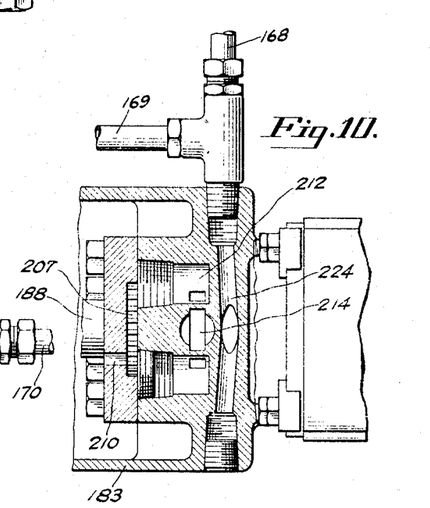
Fig. 10 is a section 10—10 of Fig. 9.
Figure 11:
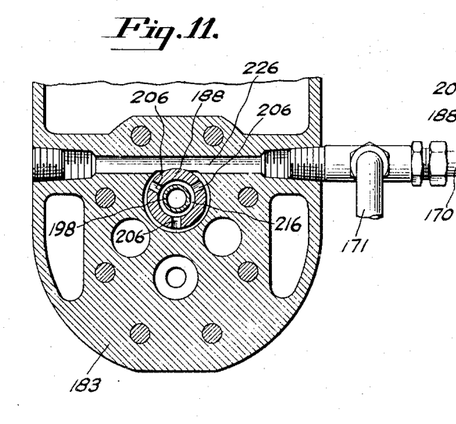
Fig. 11 is a section 11—11 of Fig. 9.

The governor which is supported by the frame of the helicopter is shown in detail in Figs. 7, 8, 9, 10 and 11. The details and functioning of the double acting governor are shown in Figs. 9, 10 and 11. The governor body 183 comprises an oil sump 184 that is filled through filler cap 186. A hollow shaft 188 is driven by beveled gear 190, Fig. 6, which meshes with beveled gear 192 which in turn is directly connected to and driven by tail rotor drive shaft 28. Directly connected to and driven by hollow shaft 188 are fly weights 194 which are balanced by speeder spring 196. The fly weights and speeder spring control the position of a pilot valve 198 that is slidably reciprocable inside hollow shaft 188. Pilot valve 198 carries fluid control lands 200 and 202 which cooperate with ports 204 and 206 respectively in the hollow shaft 188 to control hydraulic fluid through conduits 168 or 170 to operate the piston of a servo-motor, generally indicated at 172. Hollow shaft 188 carries gear 207 which meshes with hollow shaft gear 208 to form a hydraulic fluid pressure pump. Hydraulic fluid is drawn into the pump through passage 210 from sump 184 and is discharged through port 212, passage 214 to cavity 216 between lands 200 and 202. When speeder spring 196 balances fly weight 194, lands 200 and 202 cover their cooperating ports 204 and 206 causing the pressure fluid to discharge through relief valve 218 into the hollow shaft of gear 208 into sump 184. The governor speed setting is determined by compression of the speeder spring 196 adjusted by rack 220 which is driven by pinion 222 and is directly connected to pulley 178. When the speed of the rotor blades is greater than the selected governor speed setting, the fly weights 194 will cause valve 198 to move to the right, hence, land 200 will uncover its cooperating port 204 permitting pressure fluid to flow from chamber 216 into channel 224 and conduit 168 to servo-motor, generally indicated at 172, which will rotate sprocket 134, moving chain 136 which will actuate jack screws to raise jack shafts 102 and jack shaft 104 simultaneously to increase the pitch of all the rotor blades which in turn will reduce the rotor blade speed. Land 202 uncovers its cooperating port 206 permitting fluid to drain from the servo-motor through conduit 170, channel 226, port 206, chamber 228 and into the sump 184 from port 230. When the rotor blades have reached the selected governor speed setting balance will again have been established between fly weights 174 and speeder spring 196, whence the lands 200 and 202 will again cover their cooperating ports 204 and 206 shutting off flow of pressure and drain fluid and stopping action of servo-motor, generally indicated at 172.

When the speed of the rotor blades is less than the selected governor speed setting the force of speeder spring 196 will be greater than that of the fly weights 194, moving the pilot valve 198 to the left as shown in Fig. 9 and connecting conduit 170, channel 226 and port 206 to pressure fluid from the chamber 216 and connecting conduit 168 through chamber 224 and port 204 to the drain through the hollow center of pilot valve 198 and port 230. This action being the reverse of that for overspeed as described above, will cause the pitch of the rotor blades 32 to be decreased resulting in increased rotor blade speed. When the selected governor speed setting is reached, the balance between the fly weights and the speeder spring will be established closing off the ports by their cooperating lands.

Figure 5:
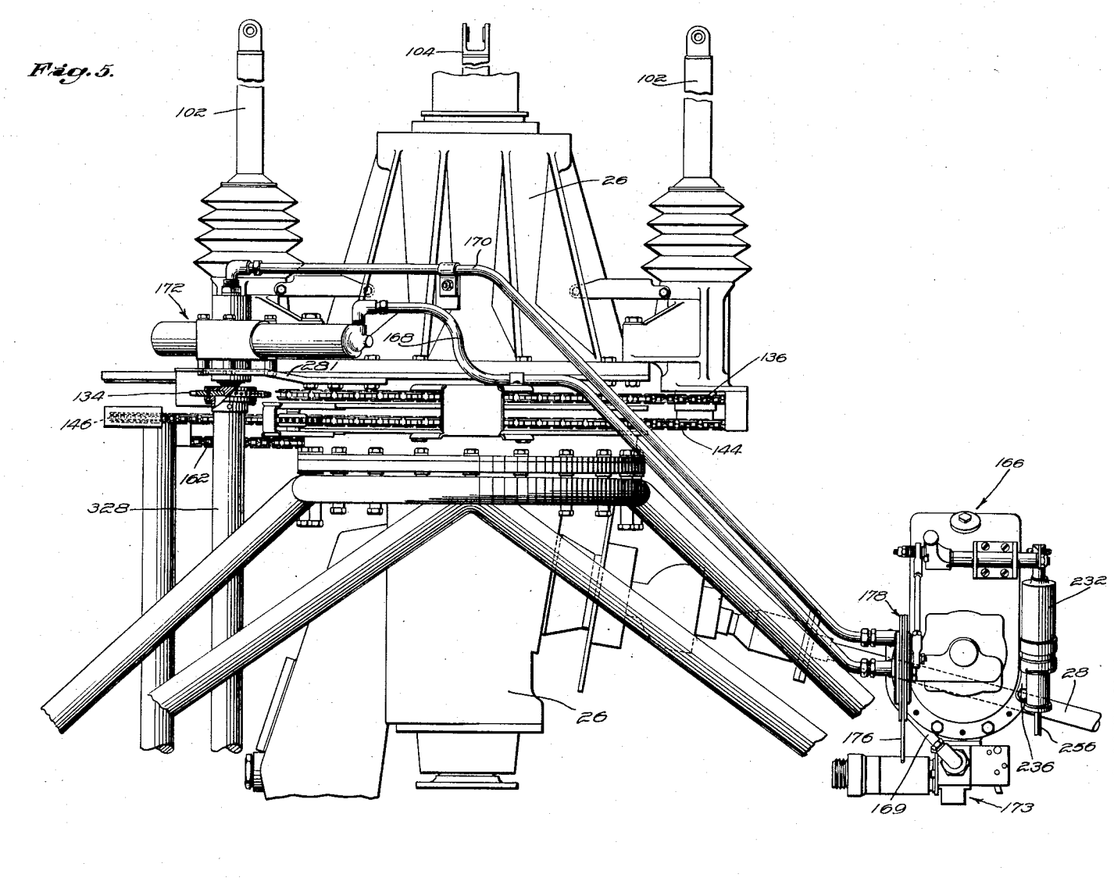
Fig. 5 is a side elevation view of the jackscrew operating means and the governor control means associated therewith.
Figures 12, 13, 14:
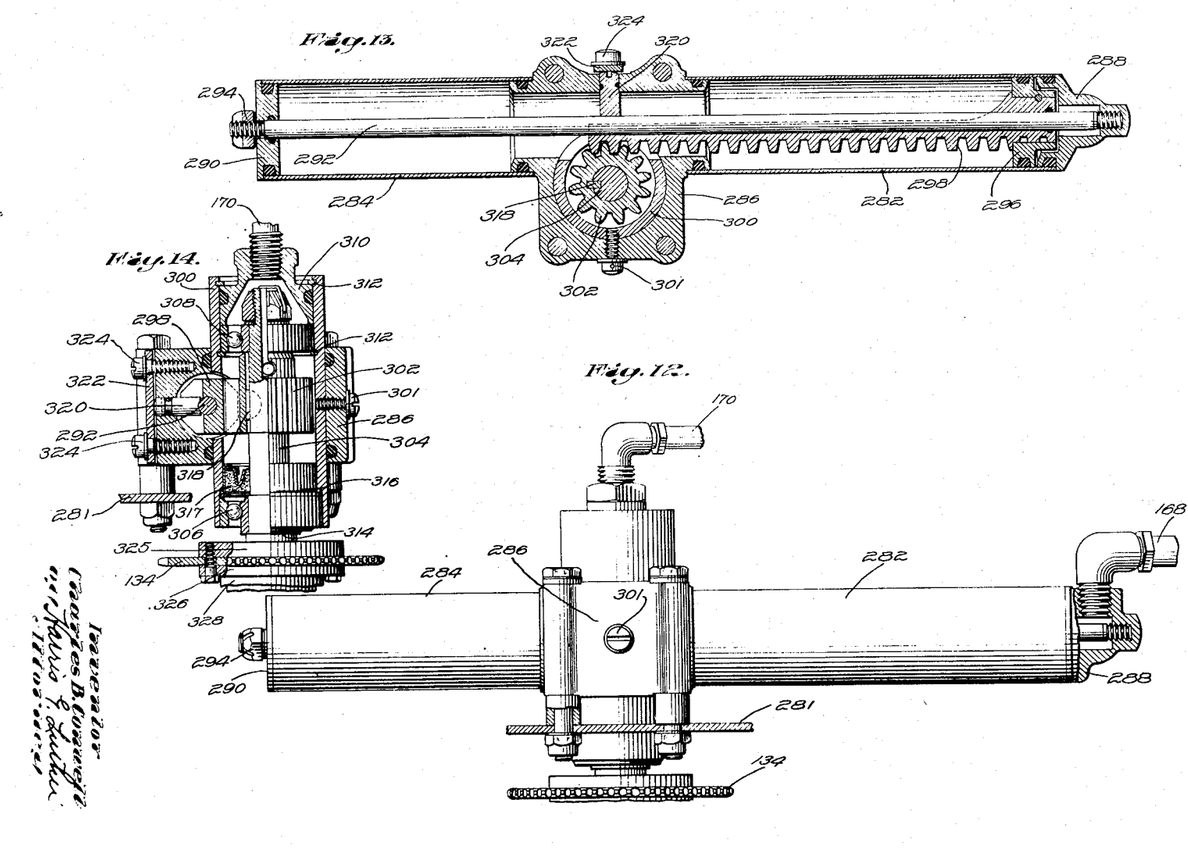
Fig. 12 is a side elevation of the servo-motor.
Fig. 13 is a plan bi-sectional view of the servo-motor.
Fig. 14 is an end sectional elevation of the servo-motor.

The servo-motor, generally indicated at 172, Figs. 1, 4 and 5, is shown in detail in Figs. 12, 13 and 14 and generally consists of a cylinder containing a hydraulically operated piston and rack gear assembly which translates linear motion to rotary motion by means of the rack gear rotating a pinion gear. The servo-motor is mounted by a flange 281 to the structure of the helicopter. The body consists of cylinders 282 and 284 which fit over annular abutments of housing 286 and have end caps 288 and 290 at their other ends. The assembly of cylinders 282 and 284, housing 286 and end caps 288 and 290 is held together by means of a rod 292 that screws into threads in cap 288 and carries a lock nut 294 at its other end outside of cap 290. All joints are sealed against hydraulic pressure by O ring seals. Hydraulic pressure fluid is admitted to either side of piston 296 through conduits 168 and 170 from the governor, generally indicated at 166 (Figs. 1 and 5). Piston 296 is sealed within cylinder 292 by O ring seals. Piston 296 has permanently connected to it a rack gear 298 which has a longitudinally drilled hole at its piston end continuing as a groove the remainder of its length for the purpose of location by and to be slidable on rod 292. Housing 286 contains annular sleeve 300 and is located and held rigidly in place by screw 301. This annular sleeve 300 houses and locates pinion gear 302 and shaft 304. Shaft 304 carrying pinion gear 302 is located in sleeve 300 and rotatably held by anti-friction bearings 306 and 308. Bearing 308 is positioned longitudinally by end cap 310 which carries conduit 170 and is held in place by snap rings 312. Bearing 306 is located by shoulder 314 carried by shaft 304 and shoulder 316 in annular sleeve 300. This assembly is held pressure tight by O ring seals and seal 317. Gear 302 is held non-rotatable with shaft 304 by means of Woodruff key 318. Gear tooth pressure between rack gear 298 and pinion gear 302 is maintained adjustable by pin 320 which is held in place by bar 322 and screws 324. Shaft 304 carries a flange 325 on its lower end that connects with sprocket 134 and flange 326 of torque tube 328 (Fig. 4).

As pressure fluid enters through conduit 168, piston 296 will move rack gear 298 which will rotate pinion gear 302 meshing with it to turn sprocket 134. Sprocket 134 will move chain 136 (Fig. 4) to operate jack screws changing the pitch of all rotor blades simultaneously as previously described. As pressure fluid enters conduit 170 the rack gear will be moved in the opposite direction rotating pinion gear 302 and sprocket 134 in the opposite direction which will result in the reverse pitch change of blades 32.

A helicopter operating under the influence of a governor controlling its vertical movements experiences a considerable time lag in responding to throttle changes. This lag is due to the large inertial forces stored in the rotor and rotor blades caused by the mass not reacting immediately to the change in torque as delivered by the engine. Since the governor is sensitive only to speed changes of the rotor and rotor blades and the change in speed lags due to the rotor and rotor blades inertia, a change in pitch of the rotor and rotor blades will not take place until after the inertia of the rotor and rotor blades has been overcome and, therefore, requires appreciable time. The purpose of this invention is to eliminate this time lag in pitch change by temporarily and automatically resetting the governor speed setting. The change in governor setting causes the blades to start to change pitch immediately and the helicopter to instantly respond to the throttle change without waiting for a material change in rotor speed. As balance between the changed engine torque and the torque absorbed by the rotor at the changed pitch is being established, the reset governor speed setting is gradually restored to its original setting.

Figures 15, 16, 17:
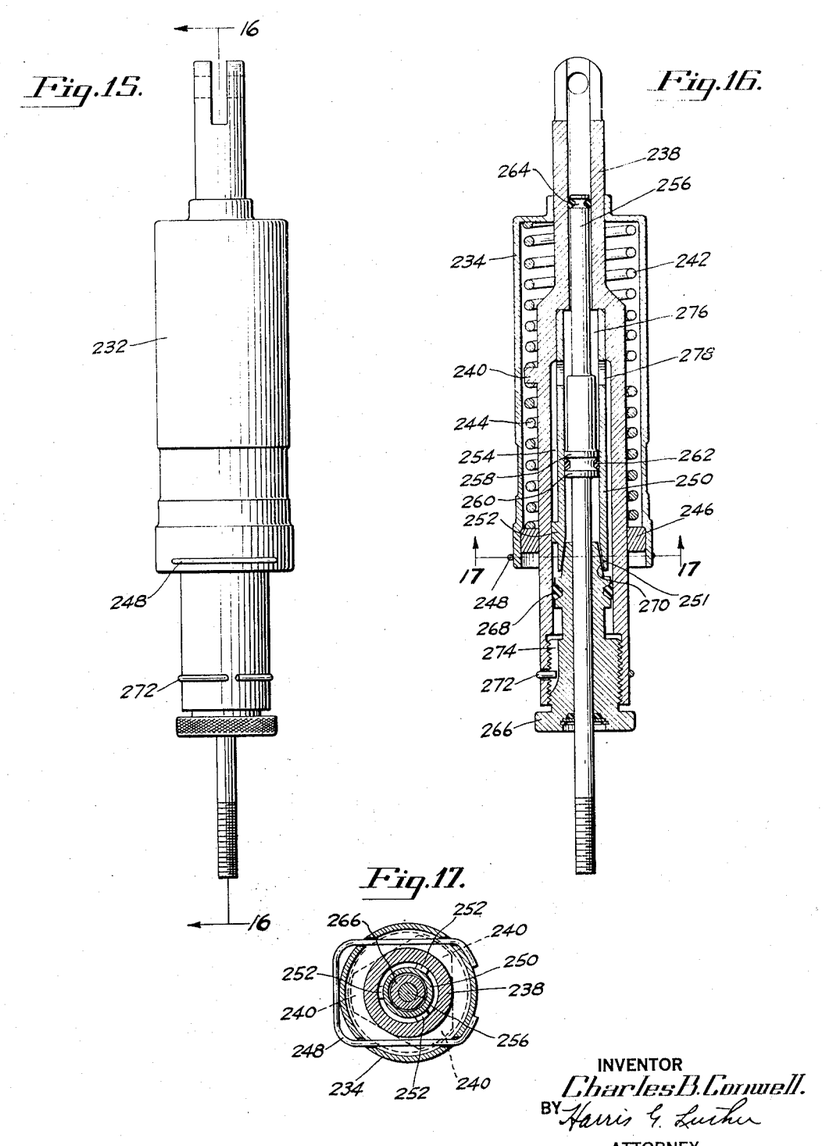
Fig. 15 is a side elevation of the anticipator.
Fig. 16 is a section 16—16 of Fig. 15.
Fig. 17 is a section 17—17 of Fig. 16.

Reference Figs. 15, 16 and 17. The temporary resetting is accomplished by means of an anticipator assembly 232 which consists of a body 234 that is rigidly mounted to the governor by bracket 236 (Fig. 7) and contains a cylinder 238 carrying annular flange 240 which forms an abutment for springs 242 and 244. The closed end of body 234 forms an abutment for the other end of spring 242 whereas annular plug 246 forms the abutment for spring 244. Plug 246 is restrained in body 234 by wire clip 248 which is inserted through holes in body 234. One extremity of hollow cylinder bushing 250 is rigidly mounted in cylinder 238 and the other end is supported by three locating lugs 252 which are tight fitting inside annular chamber 254. Said other end of hollow cylinder bushing 250 has a tapered seat 251 on its inside diameter. A piston rod 256 carries an O ring seal 262 confined by two lands 258 and 260 intermediate its ends to form a substantially fluid tight piston that is slidable inside cylinder bushing 250. Piston rod 256 is grooved to carry an O ring seal 264 on its end that is slidable inside and guided by the smallest diameter of cylinder 238. The threaded end of cylinder 238 is provided with a hollow threaded stud 266 that forms the support for the threaded end of piston rod 264, and provides sealing means for the cylinder and piston. Stud 266 at the end opposite the threading carries an externally tapered seat 270 that mates with the tapered seat 251 of fixed bushing 250. The nut 266 is locked in place by a wire snap ring which fits through a hole in cylinder 238 into slots 274, one of which is shown.

As piston rod 256 is moved toward the small diameter end of cylinder 238, fluid inside chamber 276 will pass through port 278, annular chamber 254, be metered through the adjustable orifice formed between tapered seats 251 and 270 to the other side of the piston formed by lands 258 and 260. Due to the constriction formed by the tapered seat orifice, upon initial movement of piston rod 256 cylinder 238 will move substantially with and in the same direction as piston rod 256 while body 234 remains stationary thus compressing one of the springs 242 or 244, say spring 242. As fluid is metered through the orifice, compressed spring 242 will gradually return cylinder 238 to its original centered position with respect to body 234. When piston rod 264 is moved in the opposite direction, cylinder 238 will be carried along with it compressing spring 244 and will be returned to its original position by action of the spring force as the fluid is metered through the orifice.

Reference Fig. 1: Anticipator piston rod 256 is connected to the throttle arm 329 of the carburetor 330 by means of piston rod extension 332, rocker arm 334, push rod 336, bell crank 338 and push rod 340. The throttle control 164 in the pilot's compartment 16 is connected to carburetor throttle arm 329 by means of Bowden cable 342.

Reference Figs. 7 and 8: The smallest bore end of the cylinder 238 of the anticipator 232 is connected to pulley 178 by an adjustable lever linkage consisting of crank arm 342 that is rotatably secured to cylinder 238 by pin 344. The other end of crank arm 342 is non-rotatably attached to crank shaft 346 which is rotatably carried in bracket 348 mounted on governor body 183. The other end of crank shaft 346 has non-rotatably attached to it an adjustable crank arm 350 containing an adjustment screw 352 for adjusting the lever arm position of shaft 354. Shaft 354 carries rod 356 which is rotatable about it. The other end of rod 356 is rotatably mounted on shaft 358 which is secured to sun gear 360 of differential pulley 178 (Fig. 20).

A differential pulley 178 is required with the anticipator in order to temporarily reset the governor speed setting without altering the cockpit control 174, and permitting the cockpit control to alter the governor speed setting without affecting the anticipator.

Figure 18:
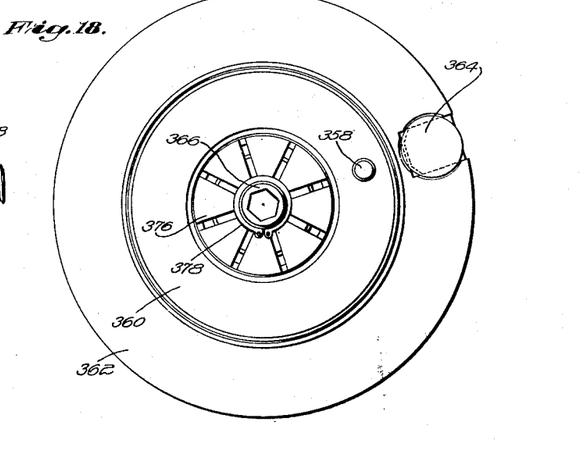
Fig. 18 is a front elevation of the differential pulley.
Figure 19:
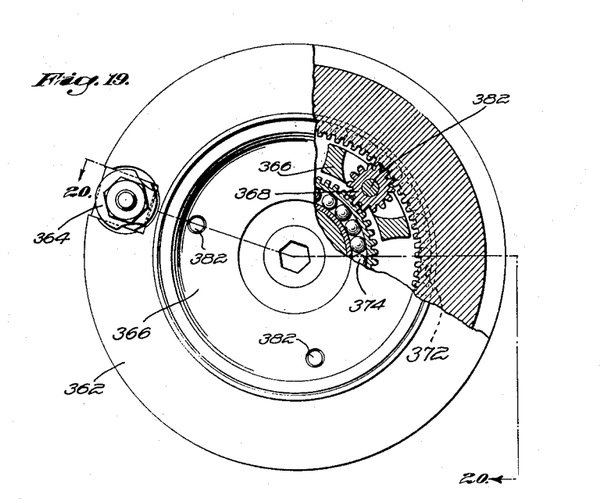
Fig. 19 is a rear elevation of the differential pulley with a section broken away to show a pinion gear meshing with the ring gear and sun gear.
Figure 20:
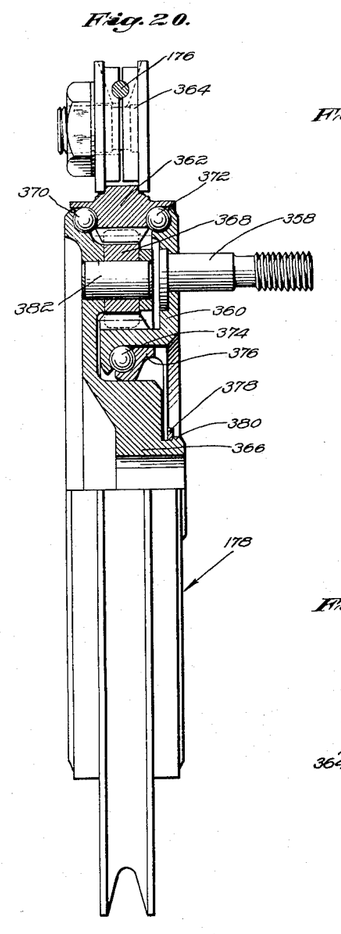
Fig. 20 is an enlarged section 20—20 of Fig. 19.

This differential pulley is shown in Figs. 18, 19 and 20. It consists of an externally V grooved ring gear 362 that has a clamp 364 in the groove for clamping the cable 176. The pinion gear cage 366 carries a multiplicity of pinion gears 368 rotatably mounted on shafts 382 that are secured in the cage and all of which mesh with the internal teeth of ring gear 362 and the external teeth of sun gear 360. Pinion gear cage 366 is attached to the governor setting pinion gear 222 (Fig. 9). Ring gear 362 is rotatable about pinion gear cage 366 and positioned by anti-friction bearings 370. Ring gear 362 is further positioned and rotatable about sun gear 360 by anti-friction bearings 372. Sun gear 360 is positioned by and rotatable about pinion gear cage 366 by anti-friction bearings 374 by means of spring loaded bearing race 376 that is held in place by snap ring 378 against abutment 380 of pinion gear cage 366.

As the cockpit throttle control 164 is moved to increase the torque of the engine 22, the piston rod 264 of anticipator 232 will be moved through the linkage previously described. As anticipator piston 264 is moved it will, because of the resistance to flow of fluid through the restricted orifice, move anticipator cylinder 238 from its centered position and through the linkage described above cause sun gear 360 to temporarily change the governor speed setting to a lower value. The governor setting now being for a lower speed than the actual speed of the rotor, the governor valve will be moved to start an immediate increase in the pitch of the rotor blades and thereby increase the lift of the rotor. Such an action will result in an immediate ascent of the helicopter without waiting for the engine torque to overcome the inertia of the rotor and blades and increase the rotor speed and then cause the normal action of the governor to increase blade pitch.

As soon as cylinder 238 moves from its centered position the centering springs will urge it back toward centered position. The rate of return will be controlled by the hydraulic fluid passing through the orifice in the anticipator. As the cylinder returns to its original position it will cause sun gear 360 to return the governor setting to its original selected speed position and the governor will then return to maintain the rotor speed constant at the selected speed. To temporarily decrease the governor speed setting the force on the speeder spring 196 (Fig. 9) is decreased and the governor signals for an increase in blade pitch.

As the throttle is closed the reverse cycle will take place decreasing the pitch of the rotor blades causing the helicopter to immediately respond with descent. In other words, the force on the speeder spring 196 is temporarily increased so that the governor signals for a decrease in blade pitch. In each instant then, the governor speed setting is temporarily modified to temporarily create an overspeed condition and an underspeed condition respectively so as to temporarily modify the blade pitch.

The rate of pitch change incident to a change in throttle setting is determined by the amount of opening of the governor valve which is determined by the amount the governor setting differs from the actual rotor speed. The amount of change in governor setting and hence the rate of pitch change by any given throttle movement can be adjusted by adjustment of the variable lever 350 and the anticipator orifice. The length of time that the governor setting is maintained in its changed position and the rate of return to the selected setting is adjustable by varying the size of the anticipator orifice between members 251 and 270 in the anticipator.

The anticipator being a time lag mechanism it will be apparent that it is responsive to the rate of change of throttle setting as distinguished from the eventual total amount of throttle change. The size of the restricted orifice in the anticipator will determine the rate of throttle change necessary to effect any change in governor setting.

With the above construction, a governor can be used which is slow enough in action to prevent hunting of the rotor while maintaining constant rotor speed in normal flight and quick changes in power can be effected and compensated for by quick changes in pitch with the resultant quick response of the helicopter.

The helicopter control has been shown without a synchronizing connection between the manual main pitch control and the throttle such as is shown and claimed in Patents Nos. 2,318,259 and 2,318,260. While the rotor is under governor control the helicopter is controlled by manipulation of the stick 123, pedals 127, the throttle and governor speed control 164, no attention being paid to the main pitch control 125 which is automatically controlled by the governor.

What it is desired to secure by Letters Patent is:

1. A governor control for an engine having a throttle movable in power increasing and decreasing directions, a load controlling speed governor comprising means for adjusting the governor speed setting, manually operated means operatively connected to said adjusting means for selecting the governor speed setting and holding said setting at the selected value, manually operated means for moving said throttle, and means operatively connecting said throttle moving means and said speed adjusting means including a device operable by movement of said throttle moving means toward and increase power direction for moving said speed adjusting means and temporarily decreasing the governor speed setting, said device including means for gradually and automatically returning the speed setting to said selected speed setting.

2. A governor control for an engine having a throttle movable in power increasing and decreasing directions, a load controlling speed governor comprising means for adjusting the governor speed setting, manually operated means operatively connected to said adjusting means for selecting the governor speed setting and holding said setting at the selected value, manually operated means for moving said throttle, and means operatively connecting said throttle moving means and said speed adjusting means including a device operable by movement of said throttle moving means toward a decrease power direction for moving said speed adjusting and temporarily increasing the governer speed setting, said device including means for gradually returning the speed setting to said selected speed setting.

3. A governor control for an engine having a throttle and a load controlling speed governor comprising means for adjusting the governor speed setting, a planetary gear train having at least two movable portions, means operatively connecting said two movable portions to said governor speed setting means, manually operated means operatively connected to one of said movable portions for moving said one portion while the other of said portions is stationary to set the governor at a selected speed setting, manually operated means for moving said throttle, means operatively interconnecting said throttle and said other portion including means operable by movement of said throttle for moving said other portion and changing the governor speed setting, and means for automatically returning said other portion and said speed setting to said selected speed setting.

4. In an engine-propeller combination, an engine, a manually adjustable throttle for regulating the engine power and movable in increase and decrease power directions, an adjustable pitch propeller drivingly connected with said engine, a speed governor controlling the propeller pitch for maintaining a substantially constant preselected speed of the combination, governor setting mechanism, a first means for positioning said governor setting mechanism and selecting the desired speed, including a first rotatable element, differential means connecting said first rotatable element with said setting mechanism, a second means operatively connected to said differential means for modifying the speed setting of said setting mechanism, and a device connecting said second means with said manually controlled throttle for movement of said second means with the throttle to change the governor setting from said selected setting upon movement of said throttle including mechanism to thereby initiate increase pitch change with increase throttle and initiate decrease pitch change with decrease throttle movement before any material speed change of the combination as a result of throttle movement.

5. In an engine-propeller combination, an engine, a manually adjustable throttle for regulating the engine power and movable in increase and decrease power directions, an adjustable pitch propeller drivingly connected with said engine, a speed governor controlling the propeller pitch for maintaining a substantially constant preselected speed of the combination, governor setting mechanism, two means connected with said setting mechanism for positioning said setting mechanism, one of said means positioning the setting mechanism to select the desired speed of said combination, the other of said means positioning the setting mechanism to modify the selected speed setting, said other means including a time lag means for gradually and automatically returning said governor setting to said selected constant speed setting, means connecting said other means with said throttle to change the governor setting from said selected setting upon movement of said throttle to thereby initiate increase pitch change with increase throttle movement and initiate decrease pitch change with decrease throttle movement before any material speed change of the combination as a result of throttle movement.

References Cited in the file of this patent

UNITED STATES PATENTS

| Number | Name | Date |
|---|---|---|
| 2,154,887 | Baker | Apr. 18, 1939 |
| 2,205,625 | Mader | June 25, 1940 |
| 2,216,163 | Ray | Oct. 1, 1940 |
| 2,317,340 | Bennett | Apr. 27, 1943 |
| 2,318,437 | Vickers | May 4, 1943 |
| 2,364,116 | Whitehead | Dec. 5, 1944 |
| 2,378,580 | Prause et al. | June 19, 1945 |
| 2,391,323 | Martin | Dec. 18, 1945 |
| 2,407,317 | Mennesson | Sept. 10, 1946 |
| 2,408,254 | DuPont | Sept. 24, 1946 |
| 2,421,873 | Forsyth | June 11, 1947 |
| 2,435,080 | Hoover | Jan. 27, 1948 |
| 2,499,813 | Brady | Mar. 7, 1950 |
| 2,529,085 | Kochenburger | Nov. 7, 1950 |
| 2,536,158 | Chamberlin et al. | Jan. 2, 1951 |